(12) United States Patent
Shin et al.

(10) Patent No.: US 11,123,880 B2
(45) Date of Patent: Sep. 21, 2021

(54) ROBOT AND OPERATING METHOD THEREOF

(71) Applicant: LG Electronics Inc., Seoul (KR)

(72) Inventors: Chul Ho Shin, Yongin-si (KR); Chang Eui Shin, Seongnam-si (KR)

(73) Assignee: LG ELECTRONICS INC., Seoul (KR)

(*) Notice: Subject to any disclaimer, the term of this patent is extended or adjusted under 35 U.S.C. 154(b) by 68 days.

(21) Appl. No.: 16/656,298

(22) Filed: Oct. 17, 2019

(65) Prior Publication Data

US 2021/0060797 A1 Mar. 4, 2021

(30) Foreign Application Priority Data

Aug. 30, 2019 (KR) .................. 10-2019-0107623

(51) Int. Cl.
| | |
|---|---|
| *B25J 15/06* | (2006.01) |
| *B25J 9/16* | (2006.01) |
| *B65G 47/91* | (2006.01) |
| *B25J 13/08* | (2006.01) |
| *A47L 15/26* | (2006.01) |
| *A47J 43/00* | (2006.01) |

(52) U.S. Cl.
CPC ......... *B25J 15/0616* (2013.01); *B25J 9/1633* (2013.01); *B25J 13/085* (2013.01); *B65G 47/91* (2013.01); *A47J 43/00* (2013.01); *A47L 15/26* (2013.01)

(58) Field of Classification Search
CPC ......... A47J 43/00; A47L 15/26; B25J 9/1633; B25J 13/085; B25J 15/0616; B65G 47/91
See application file for complete search history.

(56) References Cited

U.S. PATENT DOCUMENTS

| | | | | |
|---|---|---|---|---|
| 2003/0052495 A1* | 3/2003 | Casarotti | ............. | H01L 21/6838 294/188 |
| 2006/0138793 A1* | 6/2006 | Tanae | ..................... | B65G 47/91 294/64.3 |
| 2016/0167894 A1* | 6/2016 | Morris | .................. | C03B 35/202 414/751.1 |
| 2017/0062263 A1* | 3/2017 | Kesil | ..................... | B25J 15/0616 |
| 2019/0093670 A1* | 3/2019 | Aggarwal | ............... | F15D 1/008 |

FOREIGN PATENT DOCUMENTS

| | | |
|---|---|---|
| KR | 10-1636779 B1 | 7/2016 |
| KR | 10-1758660 B1 | 7/2017 |

\* cited by examiner

*Primary Examiner* — Saul Rodriguez
*Assistant Examiner* — Brendan P Tighe
(74) *Attorney, Agent, or Firm* — Birch, Stewart, Kolasch & Birch, LLP

(57) ABSTRACT

A robot and an operating method thereof are provided. The robot includes a controller, a force sensor configured to be electrically connected to the controller, mounted in the robot, and sense an external force applied to the robot, an arm configured to be electrically connected to the controller so that an operation is controlled by the controller, an adsorber configured to adsorb a target object, and a coupler configured to couple the arm and the adsorber. The robot may transmit or receive a wireless signal on a mobile communication network constructed according to the 5G (generation) communication.

19 Claims, 11 Drawing Sheets

ROBOT AND OPERATING METHOD THEREOF

CROSS-REFERENCE TO RELATED APPLICATION(S)

This present application claims benefit of priority to Korean Patent Application No. 10-2019-0107623, entitled "ROBOT AND OPERATING METHOD THEREOF," filed on Aug. 30, 2019, in the Korean Intellectual Property Office, the entire disclosure of which is incorporated herein by reference.

BACKGROUND

1. Technical Field

The present disclosure relates to a robot and an operating method thereof, and more particularly, to a robot used in a kitchen and an operating method thereof.

2. Description of Related Art

Description of this section only provides the background information of embodiments without configuring the related art.

Recently, application fields of robots are rapidly spreading. The robots can be used in the kitchen. Specifically, robots may be used to assist to take a meal or wash dishes.

Korean Registered Patent No. 10-1758660 discloses a meal assistance robot apparatus and a meal assistance system using the same.

Korean Registered Patent No. 10-1636779 discloses a robot arm for washing dishes and a combining power tool used in a kitchen at a normal home.

In order to wash dishes, a robot needs to perform operations of lifting dishes and moving the lifted dishes to a target position.

On the other hand, foreign objects, for example, food scraps may be left on a surface of the dish or water may be left on the surface of the dish after washing the dish. When the food scraps or water are left on the surface of the dish, it may be difficult for the robot to lift the dish.

For example, when the robot grabs and lifts the dishes, there may be a risk that the dishes may slip from the robot due to the foreign objects or water on the surface of the dishes.

On the other hand, when the dishes are adsorbed to be lifted using an air suction device, the robot may not stably adsorb the dishes due to the foreign object or water on the surface of the dishes.

Therefore, it is required to solve the above-described problem.

SUMMARY OF THE INVENTION

An embodiment suggests a robot having a structure of removing a foreign object or water on a target object, for example, a surface of dishes, using an air ejecting method.

An embodiment suggests a robot having a structure which strongly and stably lifts a target object.

An embodiment suggests a robot having a structure in which an adsorber holding a target object is easily attached or detached to or from an arm of the robot.

The objects to implement in embodiments are not limited to the technical problems described above and other objects that are not stated herein will be clearly understood by those skilled in the art from the following specifications.

According to an aspect of the present disclosure, a robot includes: a controller, a force sensor configured to be electrically connected to the controller, be mounted in the robot, and sense an external force applied to the robot, an arm configured to be electrically connected to the controller so that an operation is controlled by the controller, an adsorber configured to adsorb a target object, and a coupler configured to couple the arm and the adsorber.

The adsorber may include: a suction nozzle configured to suck air; an ejection nozzle configured to eject air; a flow passage switching device configured to be electrically connected to the controller, be connected to the suction nozzle and the ejection nozzle through a pipe, and selectively open the suction nozzle and the ejection nozzle; and a frame configured to accommodate at least a portion of the suction nozzle, the ejection nozzle, and the flow passage switching device.

The adsorber may further include: an adsorption plate provided to encircle an end of the suction nozzle; and a protrusion configured to protrude from the frame in which at least a portion of the suction nozzle, at least a portion of the ejection nozzle, and the adsorption plate are disposed, the suction nozzle and the adsorption plate are disposed at the center of the protrusion, and the ejection nozzle is disposed at the outside of the suction nozzle and the adsorption plate.

A plurality of ejection nozzles may be provided to encircle the adsorption plate.

A plurality of suction nozzles may be provided to be radially disposed at the center of the protrusion.

The flow passage switching device simultaneously opens the plurality of ejection nozzles and the plurality of ejection nozzles simultaneously ejects the air.

The flow passage switching device may sequentially open the plurality of ejection nozzles and the plurality of ejection nozzles may sequentially eject the air in a clockwise direction or a counterclockwise direction.

The plurality of ejection nozzles may alternately repeat an operation of simultaneously ejecting the air to the target object and an operation of sequentially ejecting the air to the target object in a clockwise direction or a counterclockwise direction.

When the adsorber approaches to be close to the target object, the force sensor senses a first external force generated when the air ejected from the ejection nozzles is bumped against the target object.

When the force sensor senses the first external force, the controller may gradually reduce an air ejection amount of the ejection nozzles.

When the adsorber is in contact with the target object, the force sensor senses a second external force generated by the contact between the adsorber and the target object.

When the force sensor senses the second external force, the controller controls the flow passage switching device to close the ejection nozzles and open the suction nozzles and gradually increase an air suction amount of the suction nozzles.

The robot of the embodiment may further include: a first air flow line in which one side is connected to the flow passage switching device and the other side is connected to a compressor.

The robot of the embodiment may further include: a vision sensor configured to be connected to the controller and sense a distributed pattern of foreign objects or water on a surface of the target object.

The coupler may include a first part mounted in the arm; and a second part mounted in the frame to be detachable from the first part; in the first part, a suction hole which sucks air is formed and the second part includes a ball which closes the suction hole.

The coupler may further include a second air flow line configured to communicate with the suction hole and when the air is sucked to the suction hole through the second air flow line, the ball closes an inlet of the suction hole so that the first part and the second part are coupled to each other.

According to another aspect of the present disclosure, a robot operating method includes sensing a distributed pattern of foreign objects or water on a surface of a target object, by a vision sensor; selecting an ejecting pattern of air ejected to the target object from the ejection nozzle, based on information obtained by the vision sensor, by a controller; allowing an adsorber to approach the target object; ejecting air to the target object by the ejection nozzle; sensing a first external force generated when the air ejected from the ejection nozzle is bumped against the target object, by a force sensor; gradually reducing an air ejection amount of the ejection nozzle, by the controller; sensing a second external force generated by the contact of the adsorber and the target object, by the force sensor; and adsorbing the target object, by the adsorber.

The ejecting pattern may include at least one of simultaneously ejecting air to the target object by a plurality of ejection nozzles or sequentially ejecting the air to the target object in the clockwise direction or the counterclockwise direction, by the plurality of ejection nozzles.

The adsorbing of the target object, by the adsorber, may include: sensing whether the second external force is maintained for a set time or longer, by the force sensor; stopping movement of the adsorber; controlling a flow passage switching device by the controller to close the ejection nozzle; controlling a flow passage switching device by the controller to open the suction nozzle; and gradually increasing an air suction amount of the suction nozzle by the controller.

According to the embodiment, the adsorber may simply and effectively remove the foreign object and water on the surface of the target object using the air ejection nozzle.

According to the embodiment, the adsorber adsorbs the target object after removing the foreign object and water to move the target object so that a state in which the target object is strongly and stably adsorbed is maintained. Therefore, it is possible to effectively prevent the target object from being detached from the adsorber during the movement to be broken or prevent a washing process or an organizing process of the target object, which is a dish, from being delayed.

According to the embodiment, the coupler controls an air suction device to simply couple or separate the arm and the adsorber to or from each other so that as compared with another device having a screw-type coupling structure, the operation time may be shortened, and the operation efficiency may be improved.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
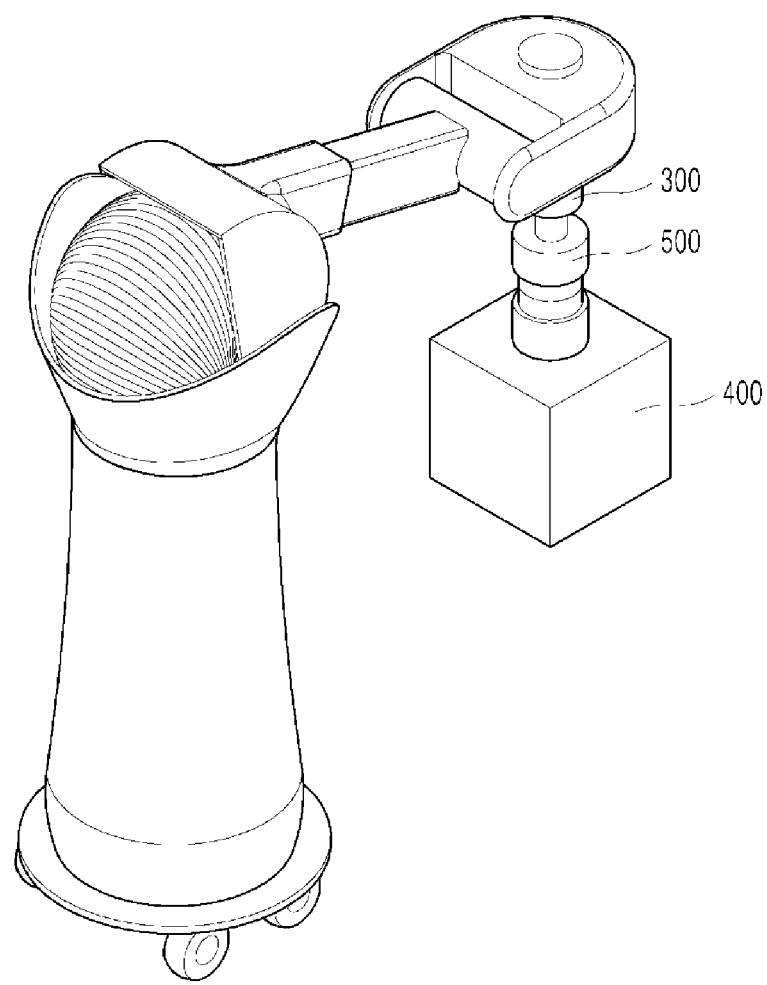
FIG. 1 is a view illustrating a robot according to one embodiment.

Hereinbelow, embodiments will be described in greater detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the spirit and technical scope of the embodiments.

Terms such as "first," "second," and other numerical terms when used herein do not imply a sequence or order unless clearly indicated by the context. The terms are used merely for the purpose to distinguish an element from the other elements. In addition, terms, which are specially defined in consideration of the configurations and operations of the embodiments, are given only to explain the embodiments, and do not limit the scope of the embodiments.

In the description of the embodiment, in the case in which it is described as being formed on "on" or "under" of each element, "on" or "under" includes two elements directly contacting each other or one or more other elements being indirectly formed between the two elements. In addition, when expressed as "on" or "under", it may include not only upwards but also downwards with respect to one element.

Further, relational terms to be described below such as "on/over/up" and "beneath/under/down" may be used to discriminate any one subject or element from another subject or element without necessarily requiring or comprehending a physical or logical relationship or sequence of subjects or elements.

An embodiment relates to a robot and an operating method thereof. A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driver including a motor in order to perform various physical operations, such as moving joints of the robot. Moreover, a movable robot may include, for example, a wheel, a brake, and a propeller in the driver thereof, and through the driver may thus be capable of traveling on the ground or flying in the air.

A robot of the embodiment may be related to artificial intelligence, autonomous driving, and extended reality. Hereinafter, this will be described first.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Autonomous driving is a self-driving technology, and an autonomous vehicle is a vehicle that moves without any manipulation by a user or with minimum manipulation by a user.

For example, autonomous driving may include all of a technology for keeping a driving lane, a technology for automatically controlling a speed such an adaptive cruise control, a technology for automatically driving a vehicle along a determined path, and a technology for, if a destination is set, automatically setting a path and driving a vehicle along the path.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

eXtended Reality (XR) collectively refers to Virtual Reality (VR), Augmented Reality (AR), and Mixed Reality (MR). VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in that both technologies involve physical objects being displayed together with virtual objects. However, while virtual objects supplement physical objects in AR, virtual and physical objects co-exist as equivalents in MR.

XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

The robot of the embodiment may include a communication device. The communication device equipped in the robot may be configured to include at least one of a mobile communication module or a wireless internet module to communicate with a server. In addition, the robot may further include a short-range communication module.

The mobile communication module may transmit and receive wireless signals to and from at least one of a base station, an external terminal, and a server on a mobile communication network established according to technical standards or communication methods for mobile communications, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5 generation (5G) communication and the like.

The wireless Internet module refers to a module for wireless Internet access. The wireless Internet module may be provided in the robot. The wireless internet module may transmit or receive wireless signals via a communication network according to wireless internet technologies.

The robot can transmit/receive data to/from a server and various terminals that can perform communication through a 5G network. In particular, the robot can perform data communication with a server and a terminal using at least one service of eMBB (enhanced mobile broadband), URLLC (ultra-reliable and low latency communications), and mMTC (massive machine-type communications) through a 5G network.

The enhanced mobile broadband (eMBB) which is a mobile broadband service provides multimedia contents, wireless data access, and so forth. Further, more improved mobile services such as a hotspot and a wideband coverage for receiving mobile traffic that are tremendously increasing can be provided through eMBB. Through a hotspot, the large-volume traffic may be accommodated in an area where user mobility is low and user density is high. Through broadband coverage, a wide-range and stable wireless environment and user mobility may be guaranteed.

The ultra-reliable and low latency communication (URLLC) service defines much stricter requirement than that of the existing LTE in terms of reliability of data transmission/reception and transmission delay and a 5G service for industrial process automation, telemedicine, tele-surgery, transportation, safety correspond thereto.

The massive machine-type communication (mMTC) is a service which is insensitive to the transmission delay which requires transmission of a comparatively small amount of data. A much larger number of terminals, such as sensors, than a general portable phone may be connected to a wireless access network by mMTC at the same time. The communication module of the terminal should be inexpensive, and there is a need for improved power efficiency and power saving technology capable of operating for years without battery replacement or recharging.

Figure 2:
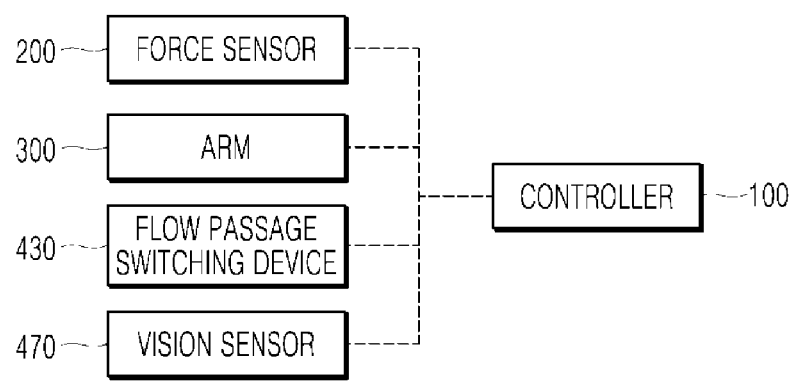
FIG. 2 is a view illustrating a structure of a robot according to one embodiment.
Figure 3:
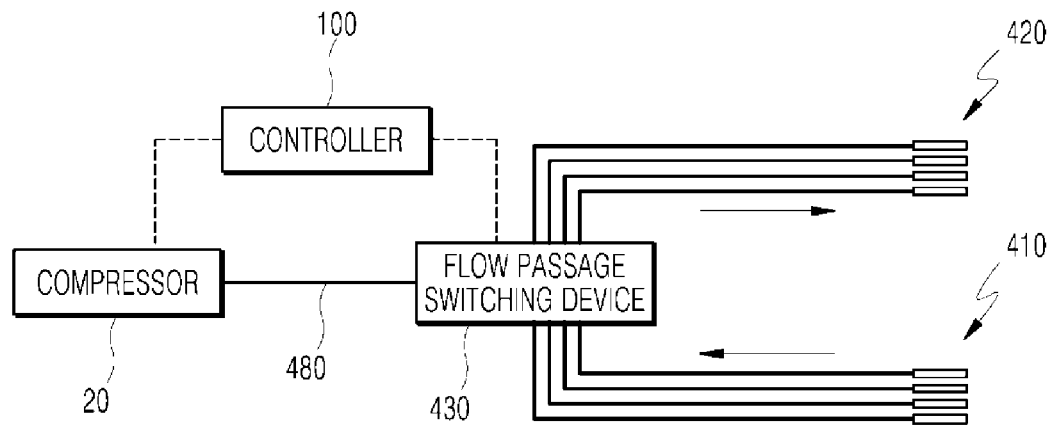
FIG. 3 is a view for explaining a function of a robot according to one embodiment.

FIG. 1 is a view illustrating a robot according to one embodiment. FIG. 2 is a view illustrating a structure of a robot according to one embodiment. FIG. 3 is a view for explaining a function of a robot according to one embodiment.

For example, the robot of the embodiment may be used for kitchen. The robot can move a target object 10. In this case, the target object 10 may be the dishes such as plates or bowls but is not limited thereto.

The robot may be used to move the target object 10. That is, the robot adsorbs the target object 10 to move to a target position and then releases the adsorption, thereby moving the position of the target object 10.

The robot includes a controller 100, a force sensor 200, an arm 300, an adsorber 400, and a coupler 500.

The controller 100 is equipped in the robot and receives information about an external force sensed by the force sensor 200, and may control operations of the arm 300, the adsorber 400, and the coupler 500.

The force sensor 200 is electrically connected to the controller 100, is mounted in the robot, and may sense an external force which is applied to the robot. For example, the adsorber 400 mounted in the robot approaches the target object 10 so that air ejected from the adsorber 400 is bumped against the target object 10 to apply the external force to the robot. Otherwise, when the adsorber 400 is in direct contact with the target object 10, if the external force is applied to the robot by the target object 10, the external force may be sensed by the force sensor 200.

For example, the force sensor 200 may be configured as a strain gage-type sensor which senses that individual configurations of the robot are finely deformed by the external force and converts the deformation into force. However, the force sensor is not limited thereto and any type of sensor which can sense the external force may be used.

If the force sensor 200 senses an external force applied to the robot and measures a magnitude of the external force, the force sensor 200 may be mounted in any portion of the robot.

The arm 300 is electrically connected to the controller 100 and the operation of the arm may be controlled by the controller 100. The arm 300 may move while rotating or moving straight, and to this end, the arm 300 may include an actuator or a motor. The controller 100 may control the actuator or the motor equipped in the arm 300 to control the movement of the arm 300.

The adsorber 400 may adsorb the target object 10 and may be coupled to the arm 300 to move in accordance with the movement of the arm 300. The adsorber 400 may adsorb the target object 10 and move with the adsorbed target object 10. When the target object 10 reaches a target position, the adsorber 400 may release the adsorption to lower the target object 10 to the target position.

The adsorber 400 may include a suction nozzle 410, an ejection nozzle 420, a flow passage switching device 430 (flow passage switch), a frame 440, an adsorption plate 450, a protrusion 460, a vision sensor 470, and a first air flow line 480.

The suction nozzle 410 may suck air. When a compressor 20 operates in a suction mode, the suction nozzle 410 may suck air so that when the suction nozzle 410 sucks air in a state that the suction nozzle 410 is in contact with the surface of the target object 10, the target object 10 may be adsorbed by the adsorber 400.

One or a plurality of suction nozzles 410 may be provided. In FIG. 3, a structure in which four suction nozzles 410 are equipped in the adsorber 400 is illustrated. However, according to another embodiment, one, two, three, or five or more suction nozzles 410 may be equipped.

On the other hand, in FIG. 3, an arrow represents an air flow direction in a pipe between the suction nozzles 410 and the flow passage switching device 430 or between the ejection nozzle 420 and the flow passage switching device 430.

The ejection nozzle 420 may eject air. When the compressor 20 operates in an ejection mode, the ejection nozzle 420 may eject air to remove foreign objects or water attached on the surface of the target object 10.

When the target object 10 is a dish, a residual of the food or water or a detergent used for washing may remain on the surface of the target object 10. When the foreign objects or water remain on the surface of the target object 10, the target object 10 is not adsorbed onto the adsorber 400 or not firmly adsorbed so that the target object 10 may be separated from the adsorber 400 during movement, to be damaged.

Therefore, in order for the adsorber 400 to stably adsorb the target object 10, in the embodiment, before adsorption, the foreign objects or water remaining in an adsorbing portion of the target object 10 may be removed using the ejected air.

The flow passage switching device 430 may be electrically connected to the controller 100 and connected to the suction nozzle 410 and the ejection nozzle 420 through the pipe and selectively open the suction nozzle 410 and the ejection nozzle 420.

When a plurality of suction nozzles 410 is equipped, the flow passage switching device 430 may simultaneously open or close all the suction nozzles 410, or simultaneously partially open or close the suction nozzles 410, or sequentially open or close the suction nozzles 410.

When a plurality of ejection nozzles 420 is equipped, the flow passage switching device 430 may simultaneously open or close all the ejection nozzles 420, or simultaneously partially open or close the ejection nozzles 420, or sequentially open or close the ejection nozzles 420.

When the plurality of suction nozzles 410 and the plurality of ejection nozzles 420 are equipped, the suction nozzles 410 and the ejection nozzles 420 may be connected to the flow passage switching device 430 through independent pipes. Therefore, the suction nozzles 410 and the ejection nozzles 420 may be independently opened or closed.

In a suction mode in which the compressor 20 operates to allow an end of the suction nozzle 410 to suck the air, the flow passage switching device 430 may open the suction nozzle 410 and close the ejection nozzle 420. In contrast, in an ejection mode in which the compressor 20 operates to allow an end of the ejection nozzle 420 to eject the air, the flow passage switching device 430 may close the suction nozzle 410 and open the ejection nozzle 420.

For example, the flow passage switching device 430 may include on/off valves corresponding to the suction nozzle 410 and the ejection nozzle 420, respectively, and the flow passage switching device 430 may open or close the on/off valves to adjust the suction nozzle 410 and the ejection nozzle 420 to be opened or closed.

One side of the first air flow line 480 may be connected to the flow passage switching device 430 and the other side may be connected to the compressor 20. The compressor 20 may control an air flow direction of the first air flow line 480.

Therefore, in the suction mode, the compressor 20 may control the air flow direction to allow the suction nozzle 410 to suck air from the outside, through the first air flow line 480, the flow passage switching device 430, the pipe, and the suction nozzle 410.

Further, in the ejection mode, the compressor 20 may control the air flow direction to allow the ejection nozzle 420 to eject air to the outside, through the first air flow line 480, the flow passage switching device 430, the pipe, and the ejection nozzle 420.

The compressor 20 may be separately equipped at the outside of the robot or in another embodiment, may be equipped in the robot as one component of the robot.

The controller 100 may be electrically connected to the compressor 20 and the flow passage switching device 430 to control the compressor 20 to be operated and the suction nozzle 410 and the ejection nozzle 420 to be opened or closed in accordance with the ejection mode and the suction mode.

The vision sensor 470 may be connected to the controller 100 and may sense a distributed pattern of the foreign object or water on the surface of the target object 10. The vision sensor 470 may be equipped in an appropriate position of the robot to visually or optically identify the target object 10 and for example, may be equipped as a lidar, a radar, a 3D camera, an RGB-D camera, an infrared sensor, or a laser sensor.

The coupler 500 may couple the arm 300 to the adsorber 400. A specific structure of the coupler 500 will be described below.

Hereinafter, a specific structure of the adsorber 400 including the frame 440, the adsorption plate 450, and the protrusion 460 will be described.

Figure 4:
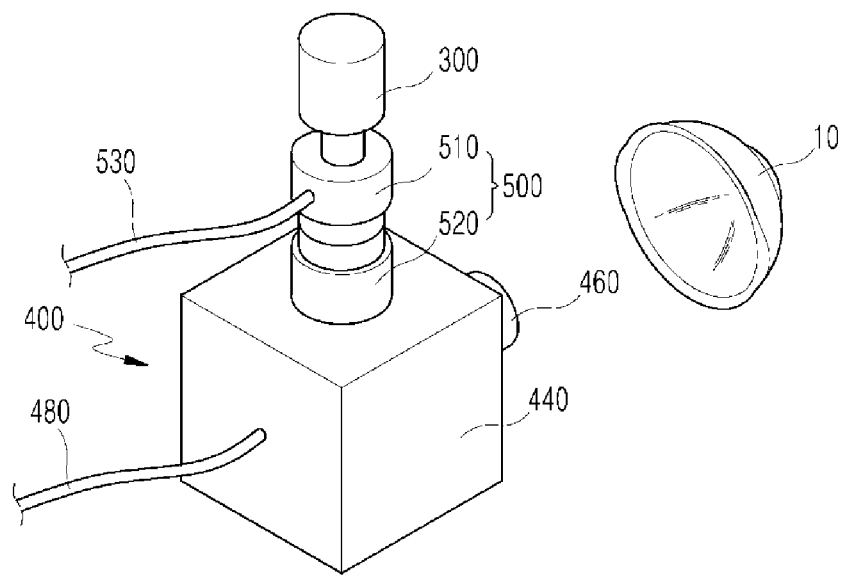
FIG. 4 is a perspective view illustrating a part of a robot according to one embodiment.
Figure 5:
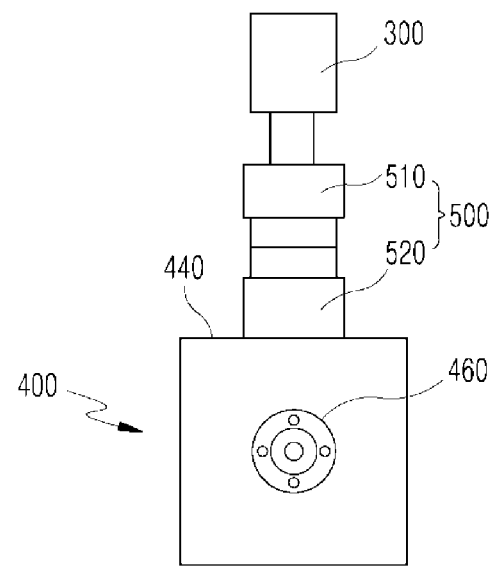
FIG. 5 is a front view illustrating a part of a robot according to one embodiment.
Figure 6:
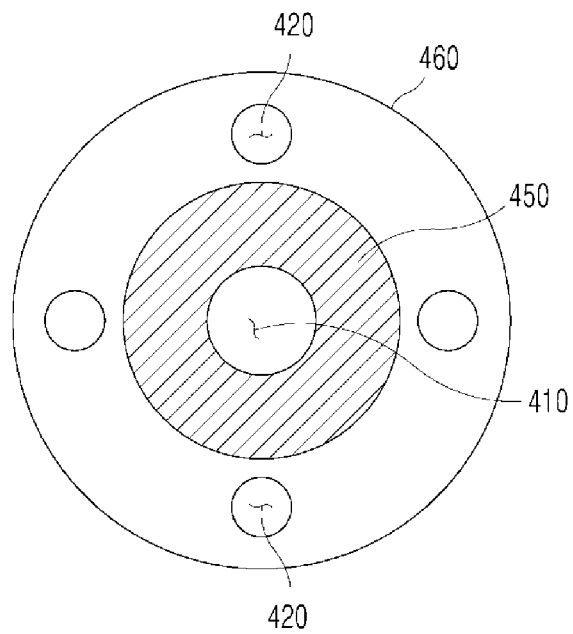
FIG. 6 is a view illustrating a part of an adsorber according to one embodiment.
Figure 7:
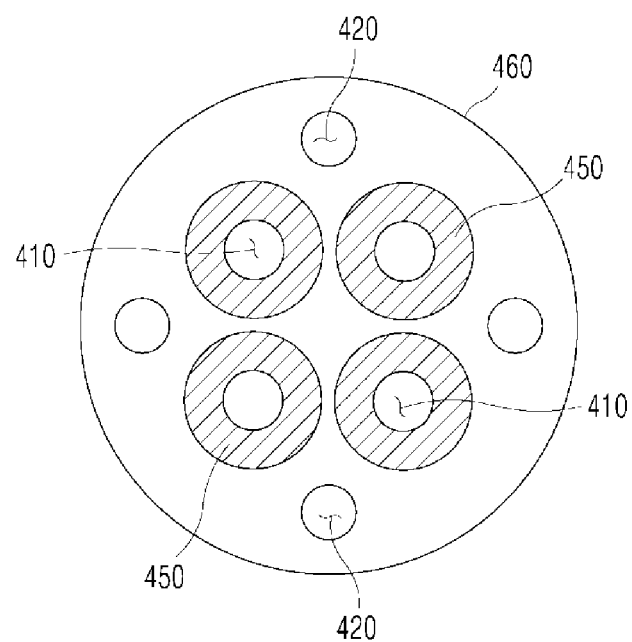
FIG. 7 is a view illustrating a part of an adsorber according to another embodiment.

FIG. 4 is a perspective view illustrating a part of a robot according to one embodiment. FIG. 5 is a front view illustrating a part of a robot according to one embodiment. FIG. 6 is a view illustrating a part of an adsorber 400 according to one embodiment. FIG. 7 is a view illustrating a part of an adsorber 400 according to another embodiment.

The frame 440 may accommodate at least a portion of the suction nozzle 410, the ejection nozzle 420, and the flow passage switching device 430.

Referring to FIGS. 4 and 5, all the suction nozzle 410, the ejection nozzle 420, the flow passage switching device 430, and the pipe which connects the nozzles and the flow passage switching device 430 are accommodated in the frame 440. However, ends of the suction nozzle 410 and the ejection nozzle 420 are disposed in the protrusion 460 of the frame 440.

The protrusion 460 may be formed to protrude from the frame 440 and the ends of the suction nozzle 410 and the ejection nozzle 420, and the adsorption plate 450 may be disposed thereon. When in contact with the target object 10, the target object 10 may be adsorbed onto the protrusion 460 by the suction nozzle 410 and the adsorption plate 450.

Referring to FIGS. 6 and 7, the adsorption plate 450 may be provided to encircle the end of the suction nozzle 410. The adsorption plate 450 may be formed of a flexible material such as rubber or urethane to be closely adhered to the surface of the target object 10.

The suction nozzle 410 and the adsorption plate 450 may be disposed at the center of the protrusion 460, and the ejection nozzle 420 may be disposed at the outside of the suction nozzle 410 and the adsorption plate 450.

Referring to FIG. 6, as an embodiment of the coupler 500, one suction nozzle 410 may be disposed at the center of the protrusion 460 and one adsorption plate 450 which encircles the suction nozzle 410 may be provided.

Referring to FIG. 7, as another embodiment of the coupler 500, a plurality of suction nozzles 410 may be provided and the suction nozzles 410 may be radially disposed at the center of the protrusion 460. Even though in FIG. 7, four suction nozzles 410 are illustrated, the present disclosure is not limited thereto and the number of provided suction nozzles 410 may be two, three, or five or more.

In this case, a plurality of adsorption plates 450 may be provided so as to encircle each of the suction nozzles 410 and the number of adsorption plates 450 may be the same as the number of suction nozzles 410.

As compared with the structure of the suction nozzle 410 illustrated in FIG. 6, the structure of the suction nozzle 410 illustrated in FIG. 7 has a larger contact area of the target object 10 and the adsorption plate 450 and has a larger contact part between the target object 10 and the adsorption plate 450, so that the suction nozzle 410 illustrated in FIG. 7 may have stronger adhesive force.

For example, when a surface roughness of the target object 10 is large or a weight of the target object 10 is heavy, an adsorber 400 having a structure in which a plurality of suction nozzles 410 illustrated in FIG. 7 is disposed at the center of the protrusion 460 may be more effectively used.

Referring to FIGS. 6 and 7, the plurality of ejection nozzles 420 may be provided and the ejection nozzles 420 may be provided to encircle the adsorption plate 450. That is, the plurality of ejection nozzles 420 may be disposed at an outer periphery of the protrusion 460 to encircle the suction nozzle 410 and the adsorption plate 450.

Figure 8:
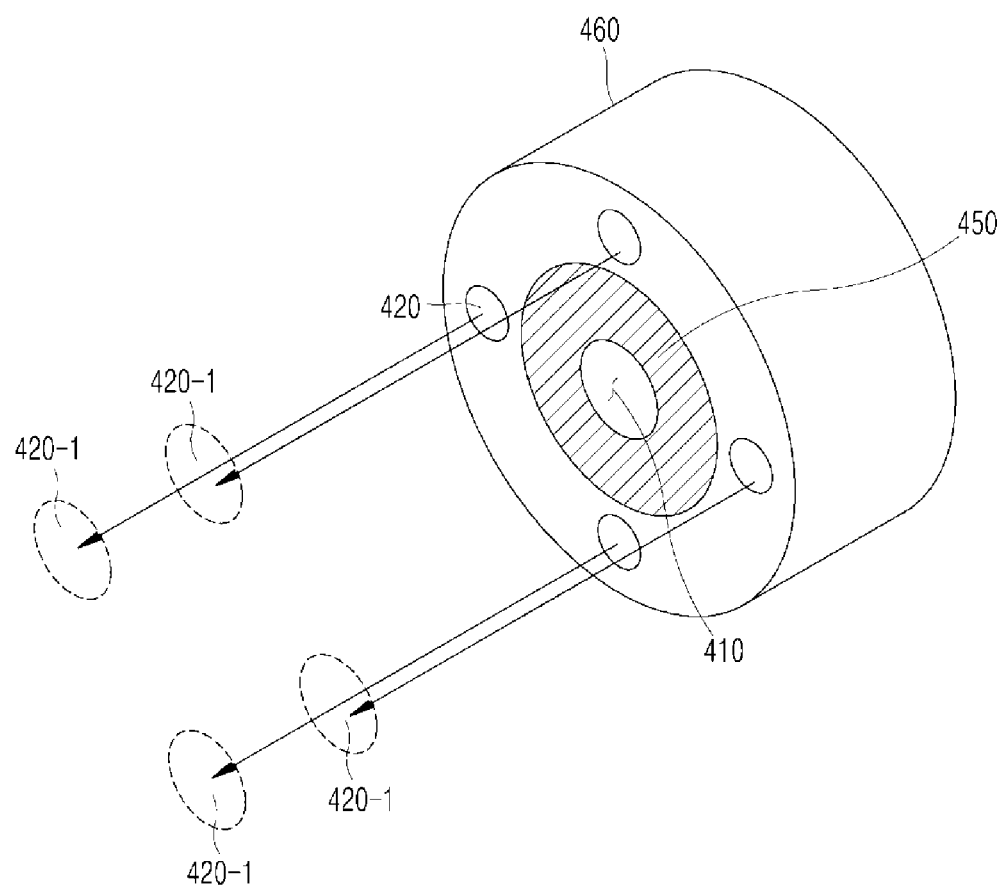
FIG. 8 is a view for explaining a function of an adsorber according to one embodiment.

FIG. 8 is a view for explaining a function of an adsorber 400 according to one embodiment. In an ejection mode, air may be ejected from the ejection nozzles 420 to be bumped against target points 420-1 of a surface of the target object 10. Therefore, the foreign objects and water on the target points 420-1 may be removed by the air.

Since the adsorber 400 moves while the target object 10 does not move, the distance from the end of the ejection nozzle 420 to the target point 420-1 may vary in accordance with the movement of the adsorber 400. Therefore, it is necessary to adjust an air ejecting force of the ejection nozzle 420 to be large enough to allow the air to be bumped against the target points 420-1 even at a relatively long distance.

First, after removing the foreign objects or water from the surface of the target object 10 by ejecting air from the ejection nozzle 420, when the adsorber 400 is in contact with the target object 10, the ejection nozzle 420 may be closed to stop air ejecting and the suction nozzle 410 may be open to stably adsorb the target object 10. The operation method will be described in more detail below.

Figure 9A:
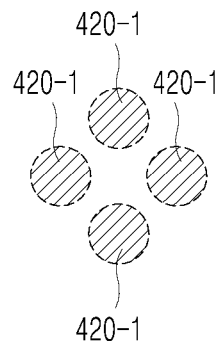
FIGS. 9A and 9B are views for explaining an air ejecting method of a robot according to one embodiment.
Figure 9B:
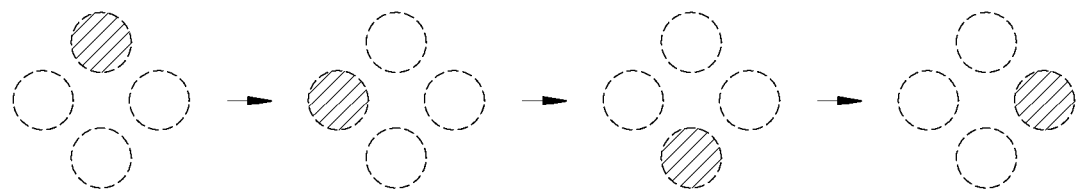

FIGS. 9A and 9B are views for explaining an air ejecting method of a robot according to one embodiment.

Referring to FIG. 9A, according to an embodiment, the flow passage switching device 430 may simultaneously open the plurality of ejection nozzles 420 and the plurality of ejection nozzles 420 may simultaneously eject air.

The air which is simultaneously ejected from the plurality of ejection nozzles 420 may be bumped against the target object 10 at one time to remove the foreign objects and water on the surface of the target object 10. The above-described ejecting method may be effective to be performed when the foreign objects and water on the surface of the target object 10 are distributed to be concentrated in a relatively narrow range.

Referring to FIG. 9B, according to another embodiment, the flow passage switching device 430 may sequentially open the plurality of ejection nozzles 420, and the plurality of ejection nozzles 420 may sequentially eject air in a clockwise direction or a counterclockwise direction.

The air may be sequentially ejected to the target object 10 to sweep the foreign objects and water from the surface of the target object 10 to remove the foreign objects and water. The above-described ejecting method may be effective to be performed when the foreign object and water are distributed in a relatively broader range on the surface of the target object 10.

As another embodiment, the plurality of ejection nozzles 420 may alternately repeat an operation of simultaneously ejecting air to the target object 10 and an operation of sequentially ejecting air to the target object 10 in a clockwise direction or a counterclockwise direction.

That is, the air ejecting methods illustrated in FIGS. 9A and 9B may be alternately repeated. The above-described ejecting method may be effective to be performed when a large amount of foreign object and water is distributed in a relatively broader range on the surface of the target object 10.

Figure 10:
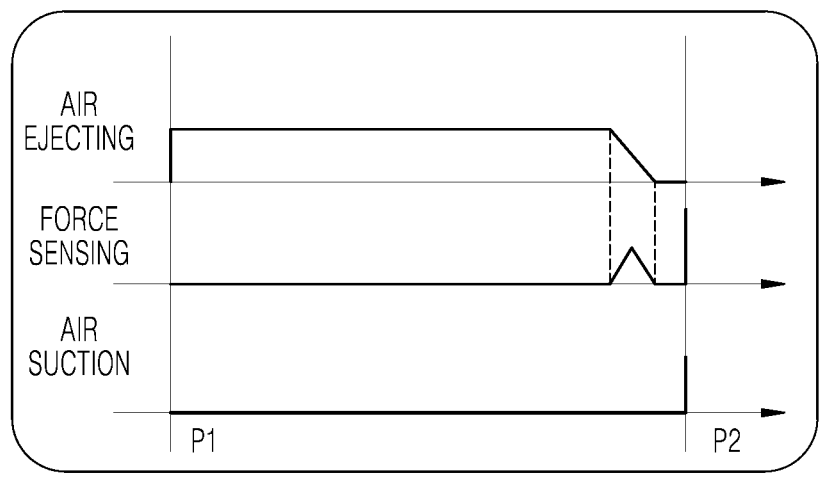
FIGS. 10 and 11 are views for explaining an operation of a robot according to one embodiment.
Figure 11:
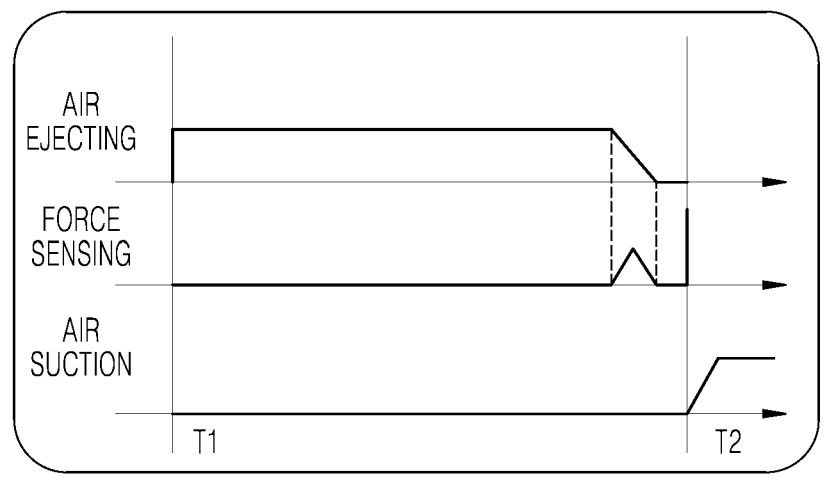

FIGS. 10 and 11 are views for explaining an operation of a robot according to one embodiment.

In FIG. 10, a horizontal axis represents a position change when the adsorber 400 moves. P1 indicates a position where the adsorber 400 is spaced apart from the target object 10 and P2 indicates a position where the adsorber 400 is in contact with the target object 10. The adsorber 400 moves to the target object 10 at P1 and is in contact with the target object 10 at P2.

In FIG. 10, a vertical axis of an "air ejection" graph represents an amount of ejected air, a vertical axis of "force sensing" indicates a magnitude of force sensed by the force sensor, and a vertical axis of "air suction" indicates an amount of sucked air.

In FIG. 11, a horizontal axis represents a time change when the adsorber 400 moves. T1 refers to a time when the adsorber 400 is in a position which is spaced apart from the target object 10, that is, at P1 and T2 refers to a time when the adsorber 400 is in contact with the target object 10, that is, at P2.

When the target object 10 is located on a floor of a countertop, a wall surface, or an appropriate holder, the adsorber 400 is spaced apart from the target object 10. The adsorber 400 may eject air through the ejection nozzles 420 while approaching the target object 10.

When the adsorber 400 approaches to be close to the target object 10, the force sensor 200 may sense a first external force generated when the air ejected from the ejection nozzles 420 is bumped against the target object 10. That is, when the adsorber 400 approaches the target object 10, the air ejected from the ejection nozzles 420 is bumped against the target objects 10 and the air flow direction is changed so that the adsorber 400 is applied with a repulsive force, that is, the first external force, and the first external force may be sensed by the force sensor 200.

In a "force sensing" graph of FIGS. 10 and 11, it is illustrated that the first external force generated before the adsorber 400 approaches the target object 10 is sensed by the force sensor 200.

When the force sensor 200 senses the first external force, the controller 100 may gradually reduce the air ejection amount of the ejection nozzles 420. The controller 100 may gradually reduce the air ejection amount by adjusting an output of the compressor 20.

When the adsorber 400 closely approaches the target object 10 so as to allow the force sensor 200 to sense the first external force, it is considered that the foreign objects and water on the surface of the target object 10 are sufficiently removed so that it is necessary to reduce the air ejection amount. Further, in order to prevent an excessive impact from being applied to the target object 10, it is necessary to reduce the air ejection amount.

According to the "force sensing" graph of FIGS. 10 and 11, the force sensor 200 senses the first external force and thus the air ejection amount is gradually reduced so that it is represented that the magnitude of the sensed force is increased and then reduced in a section where the air ejection amount is gradually reduced.

When the adsorber 400 is in contact with the target object 10, the force sensor 200 may sense a second external force generated by the contact between the adsorber 400 and the target object 10.

The target object 10 is supported by the floor of the countertop, the wall surface, or the holder and thus when the adsorber 400 is in contact with the target object 10, a repulsive force, that is, a second external force is transmitted from the target object 10 to the adsorber 400 and the second external force is sensed by the force sensor 200.

When the force sensor 200 senses the second external force, the controller 100 may control the flow passage switching device 430 to close the ejection nozzle 420 and open the suction nozzle 410. The suction nozzle 410 may be open and the operation of the compressor 20 may be changed so that the suction nozzle 410 sucks the air to adsorb the target object 10.

In this case, the controller 100 may gradually increase the air suction amount of the suction nozzle 410. When the adsorber 400 and the target object 10 are in contact with each other and air is excessively instantaneously sucked, the target object 10 may be damaged. Therefore, in order to safely adsorb the target object 10, the air suction amount of the suction nozzle 410 may be gradually increased.

When the air suction amount reaches a set value, the controller 100 maintains the air suction amount of the suction nozzle 410 at a constant value.

In the "air suction" graph of FIG. 11, the air suction amount is gradually increased after T2 which is the time when the adsorber 400 and the target object 10 are in contact with each other and then when the air suction amount reaches a set value, the air suction amount is maintained at a constant value.

After adsorbing the target object 10 as described above, when the adsorber 400 moves with the adsorbed target object 10 and reaches the target position, the controller 100 may stop the suction of the air so that the target object 10 is detached from the adsorber 400 and the target object 10 may complete moving to the target position.

According to the embodiment, the adsorber 400 may simply and effectively remove the foreign object and water on the surface of the target object 10 using the air ejection nozzle 420.

In the embodiment, the adsorber 400 can adsorb and move the target object 10 after removing the foreign objects and water so that a state in which the target object 10 is firmly and stably adsorbed is maintained. Therefore, it is possible to effectively prevent the target object 10 from being detached from the adsorber 400 while moving to be damaged or the washing operation and the organizing operation of the target object 10, which is dishes, from being delayed.

Figure 12A:
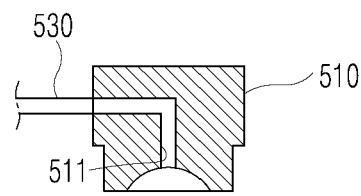
FIGS. 12A and 12B are views for explaining an operation of a coupler according to one embodiment.
Figure 12A:
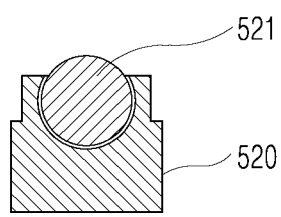
Figure 12B:
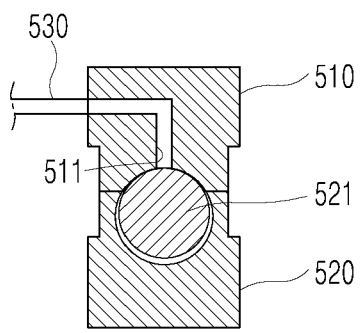

FIGS. 12A and 12B are views for explaining an operation of a coupler 500 according to one embodiment. FIG. 12A illustrates a first part 510 and a second part 520 which are separated from each other and FIG. 12B illustrates the first part 510 and the second part 520 which are coupled to each other.

Referring to FIGS. 4, 5, 12A, and 12B, the coupler 500 may include the first part 510, the second part 520, and a second air flow line 530.

The first part 510 may be mounted in the arm 300. The second part 520 may be mounted in the frame 440 and may be provided to be detachable from the first part 510.

In the first part 510, a suction hole 511 which sucks the air may be formed and the second part 520 may include a ball 521 which closes the suction hole 511.

The second air flow line 530 may be provided to communicate with the suction hole 511. The second air flow line 530 may be connected to the air suction device and the suction hole 511 may suck the air according to the operation of the air suction device. The air suction device may be configured to be separately from the compressor 20 and controlled by the controller 100.

The ball 521 may be provided to be seated in a seating groove formed in the second part 520. Even though the ball 521 is constrained by the seating groove, a diameter of the seating groove is larger than a diameter of the ball 521 so that the ball 521 may move to some extent in the seating groove.

Referring to FIG. 12B, in a state when the first part 510 and the second part 520 are in contact with each other, the air suction device may operate to suck the air into the second air flow line 530 and the suction hole 511.

When the air is sucked into the suction hole 511 through the second air flow line 530, the ball 521 may close an inlet of the suction hole 511 so that the first part 510 and the second part 520 are coupled to each other.

When the air is sucked into the suction hole 511, the air may pull the ball 521 so that the ball 521 moves to the suction hole 511 to close the suction hole 511. A negative pressure or a vacuum is maintained in the suction hole 511 so that the first part 510 in which the suction hole 511 is formed may be maintained to pull the ball 521 and thus the coupled state of the first part 510 and the second part 520 may be maintained.

When the operation of the air suction device stops, the inside of the suction hole 511 may be at a normal pressure, that is, an atmospheric pressure and the first part 510 and the second part 520 may be separated.

In the embodiment, the coupler 500 may control the air suction device to simply couple or separate the arm 300 and the adsorber 400 so that as compared with another device having a screw-type coupling structure, an operation time may be shortened, and an operation efficiency may be increased.

On the other hand, the first air flow line 480 and the second air flow line 530 may be formed of a flexible material so that it may not interrupt the movement of the adsorber 400 or the coupling or separation between the adsorber 400 and the arm 300.

Figure 13:
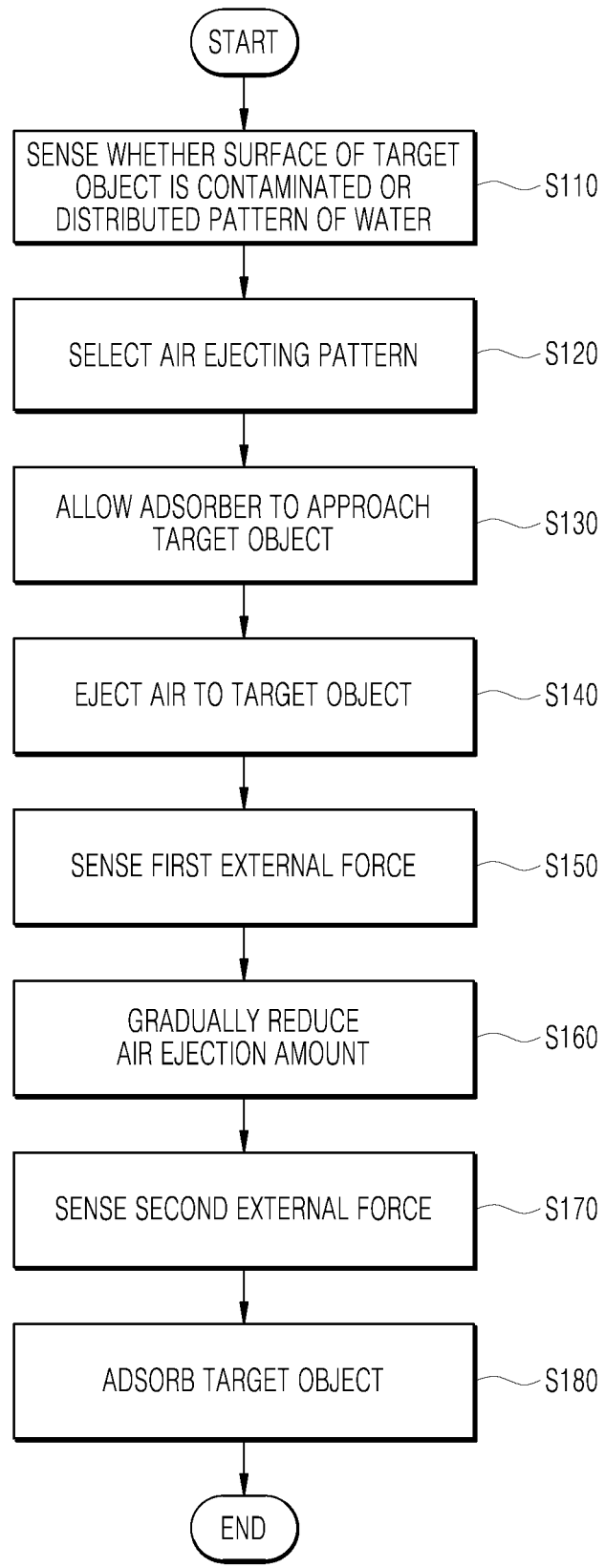
FIG. 13 is a flowchart illustrating an operating method of a robot according to one embodiment.

FIG. 13 is a flowchart illustrating an operating method of a robot according to one embodiment. Hereinafter, a process that the adsorber 400 adsorbs the target object 10 in a state when the adsorber 400 is located at P1 will be described.

The vision sensor 470 equipped in the robot may sense a distributed pattern of the foreign objects or water on the surface of the target object 10 in step S110.

The controller 100 may select an ejecting pattern of the air ejected to the target object 10 from the ejection nozzle 420 based on information obtained from the vision sensor 470 in step S120. As described above, as the ejecting pattern, at least one of an operation of simultaneously ejecting air to the target object 10 by the plurality of ejection nozzles 420 or an operation of sequentially ejecting the air to the target object 10 in the clockwise direction or the counterclockwise direction by the plurality of ejection nozzles 420 may be included.

For example, when the foreign object or water is distributed to be concentrated in a relatively narrow range of the surface of the target object 10, the plurality of ejection nozzles 420 may simultaneously eject the air.

When the foreign object or water is distributed in a relatively broader range of the surface of the target object, the plurality of ejection nozzles 420 may sequentially and simultaneously eject the air.

Further, when a large amount of foreign object or water is distributed in a relatively broader range of the surface of the target object, the above simultaneous ejecting method and sequential ejecting method may be combined.

The adsorber 400 may approach the target object 10 in step S130.

Simultaneously, the ejection nozzle 420 may eject the air to the target object 10 in step S140. As the ejection nozzle 420 approaches to be close to the target object 10, the foreign object or water may be removed from the surface of the target object 10 by the ejected air.

The force sensor 200 may sense a first external force generated when the air ejected from the ejection nozzle 420 is bumped against the target object 10 in step S150. As soon as the force sensor 200 senses the first external force, the controller 100 may gradually reduce the air ejection amount of the ejection nozzles 420 in step S160.

The force sensor 200 may sense a second external force generated by the contact between the adsorber 400 and the target object 10 in step S170. When the force sensor 200 senses a second external force, the adsorber 400 may adsorb the target object 10 in step S180.

Figure 14:
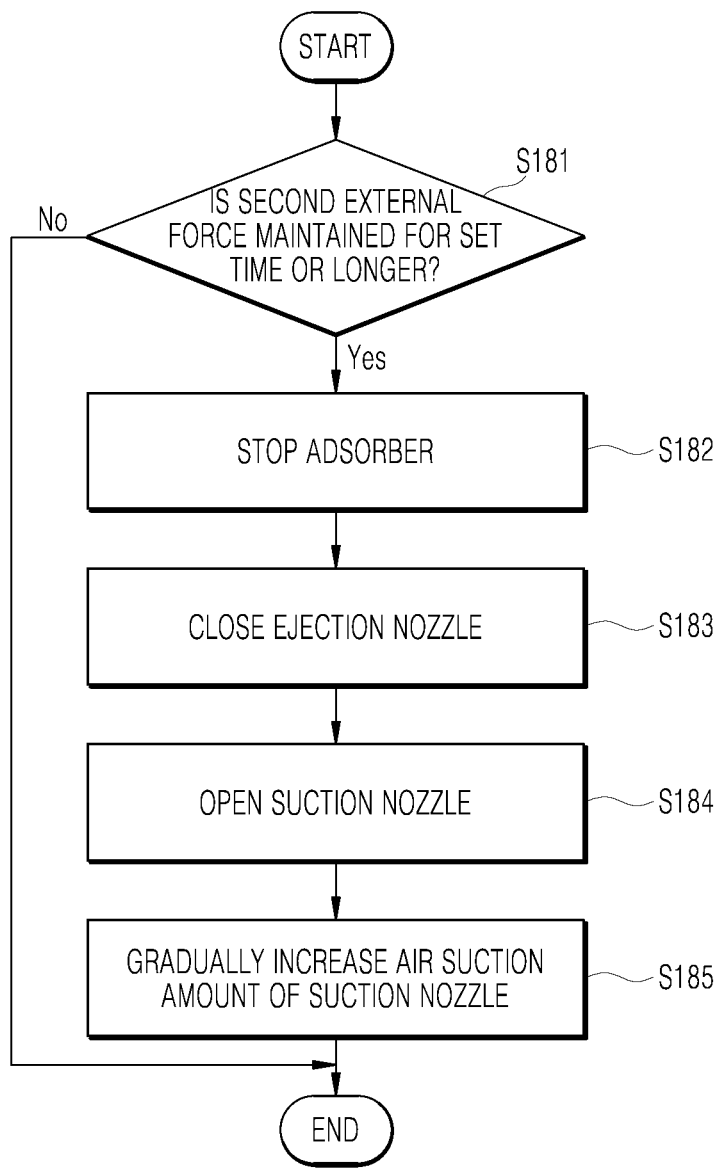
FIG. 14 is a flowchart illustrating a method of adsorbing a target object of a robot according to one embodiment.

FIG. 14 is a flowchart illustrating a method of adsorbing a target object 10 of a robot according to one embodiment. The step S180 may be specifically proceeded as follows.

The force sensor 200 may sense whether the second external force is maintained for a set time or longer in step S181. If the second external force is not maintained for the set time or longer, the adsorber 400 may continuously move toward the target object 10. If the second external force is maintained for the set time or longer, the adsorber 400 may stop movement in step S182.

The controller 100 may control the flow passage switching device 430 to close the ejection nozzle 420 in step S183. The controller 100 may control the flow passage switching device 430 to open the suction nozzle 410 in step S184. In this case, the controller 100 may gradually increase the air suction amount of the suction nozzle 410 in step S185.

When the air suction amount of the suction nozzle 410 reaches a set value, the controller 100 may maintain the air suction amount as it is. The adsorber 400 may move to a target position where the target object 10 is to be moved in a state in which the target object 10 is adsorbed.

Hereinafter, an AI device, an AI server, and an AI system according to the embodiment will be described.

Figure 15:
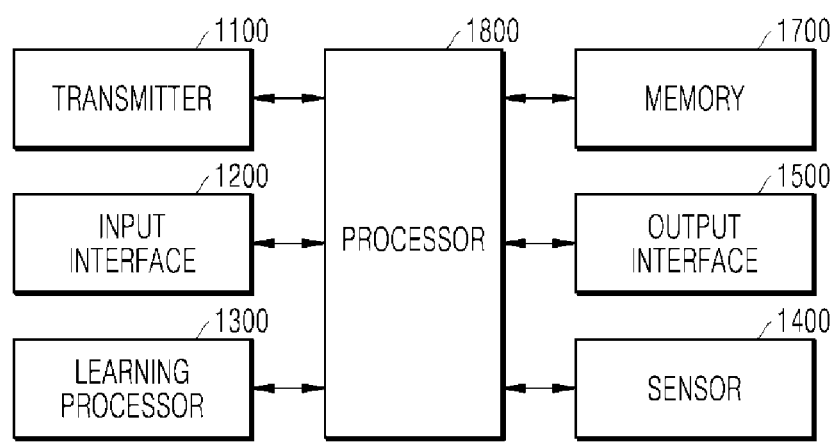
FIG. 15 illustrates an AI device according to one embodiment.

FIG. 15 illustrates an AI device 1000 according to one embodiment.

The AI device 1000 may be implemented by a fixed device or a mobile device such as a TV, a projector, a mobile phone, a smart phone, a desktop computer, a notebook, a digital broadcasting terminal, a personal digital assistance (PDA), a portable multimedia player (PMP), a navigation, a tablet PC, a wearable device, a set-top box (STB), a DMB receiver, a radio, a washing machine, a refrigerator, a desktop computer, a digital signage, a robot, or a vehicle.

Referring to FIG. 15, the terminal 1000 may include a transmitter 1100, an input interface 1200, a learning processor 1300, a sensor 1400, an output interface 1500, a memory 1700, a processor 1800, and the like.

The transmitter 1100 may transmit or receive data with external devices such as other AI devices 1000*a* to 1000*e* or an AI server 2000 using a wired/wireless communication technology. For example, the transmitter 1100 may transmit or receive sensor data, user input, a learning model, a control signal, and the like with the external devices.

The communication technology used by the transmitter 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input interface 1200 may obtain various types of data.

The input interface 1200 may include a camera for inputting an image signal, a microphone for receiving an audio signal, and a user input interface for receiving information inputted from a user. Here, the camera or the microphone is treated as a sensor so that a signal obtained from the camera or the microphone may also be referred to as sensing data or sensor information.

The input interface 1200 may obtain, for example, learning data for model learning and input data used when output is obtained using a learning model. The input interface 1200 may obtain raw input data. In this case, the processor 1800 or the learning processor 1300 may extract an input feature by preprocessing the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000.

The learning processor 1300 may include a memory which is combined or implemented in the AI device 1000. Alternatively, the learning processor 1300 may be implemented using the memory 1700, an external memory directly coupled to the AI device 1000, or a memory maintained in an external device.

The sensor 1400 may obtain at least one of internal information of the AI device 1000, surrounding environment information of the AI device 1000, or user information by using various sensors.

The sensor 1400 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output interface 1500 may generate a visual, auditory, or tactile related output.

The output interface 1500 may include a display outputting visual information, a speaker outputting auditory information, and a haptic module outputting tactile information.

The memory 1700 may store data supporting various functions of the AI device 1000. For example, the memory 1700 may store input data, the learning data, the learning model, or learning history obtained from the input interface 1200.

The processor 1800 may determine at least one executable operation of the AI device 1000 based on information determined or generated by using a data analysis algorithm or a machine learning algorithm. In addition, the processor 1800 may control components of the AI device 1000 to perform the determined operation.

To this end, the processor 1800 may request, retrieve, receive, or use data of the learning processor 1300 or the memory 1700, and may control components of the apparatus 1000 to execute a predicted operation or an operation determined to be preferable of the at least one executable operation.

When it is required to be linked with the external device to perform the determined operation, the processor 1800 may generate a control signal for controlling the external device and transmit the generated control signal to the external device.

The processor 1800 obtains intent information about user input, and may determine a requirement of a user based on the obtained intent information.

The processor 1800 may obtain intent information corresponding to user input by using at least one of a speech to text (STT) engine for converting voice input into a character string or a natural language processing (NLP) engine for obtaining intent information of a natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 1300, trained by a learning processor 2400 of an AI server 2000, or trained by distributed processing thereof.

The processor 1800 collects history information including, for example, operation contents and user feedback on an operation of the AI device 1000, and stores the history information in the memory 1700 or the learning processor 1300, or transmits the history information to an external device such as an AI server 2000. The collected history information may be used to update a learning model.

The processor 1800 may control at least some of components of the AI device 1000 to drive an application stored in the memory 1700. Furthermore, the processor 1800 may operate two or more components included in the AI device 1000 in combination with each other to drive the application.

Figure 16:
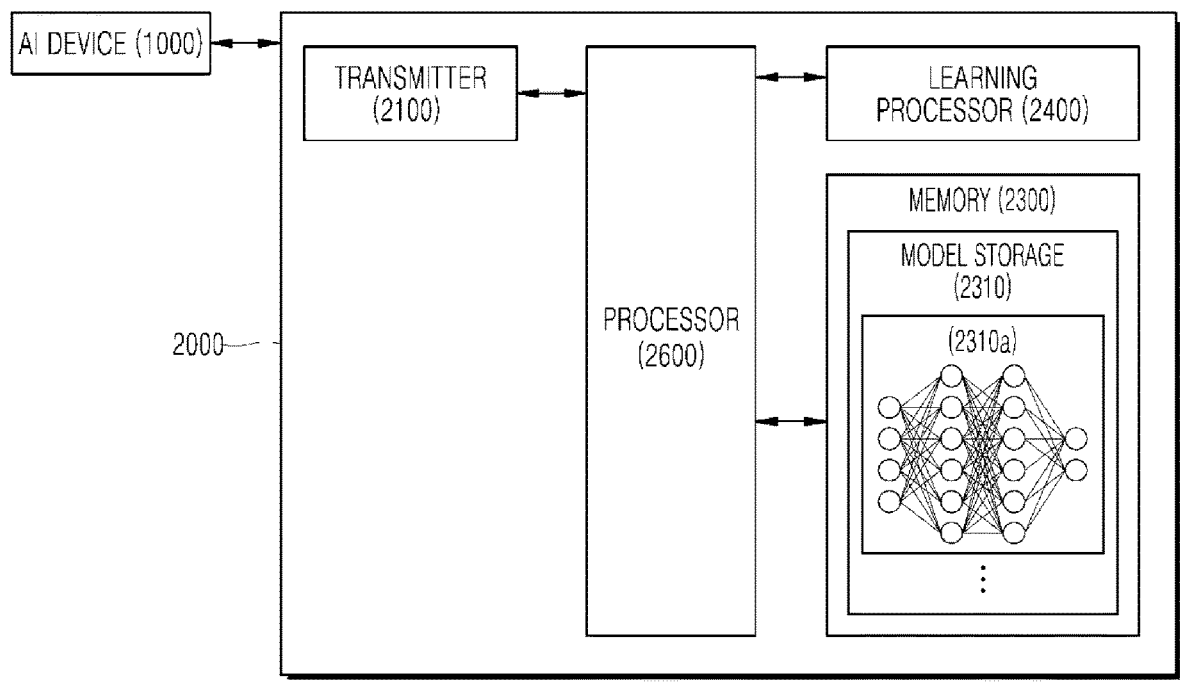
FIG. 16 illustrates an AI server according to one embodiment.

FIG. 16 is a view illustrating an AI server 2000 according to an embodiment of the present disclosure.

Referring to FIG. 16, the AI server 2000 may refer to a device for training an artificial neural network using a machine learning algorithm or using a trained artificial neural network. Here, the AI server 2000 may include a plurality of servers to perform distributed processing, and may be defined as a 5G network. In this case, the AI server 2000 may be included as a configuration of a portion of the AI device 1000, and may thus perform at least a portion of the AI processing together.

The AI server 2000 may include a transmitter 2100, a memory 2300, a learning processor 2400, and a processor 2600.

The transmitter 2100 may transmit and receive data with an external device such as the AI device 1000.

The memory 2300 may include a model storage 2310. The model storage 2310 may store a model (or an artificial neural network 2310*a*) learning or learned via the learning processor 2400.

The learning processor 2400 may train the artificial neural network 2310*a* using learning data. The learning model may be used while mounted in the AI server 2000 of the artificial neural network, or may be used while mounted in an external device such as the AI device 1000.

The learning model may be implemented as hardware, software, or a combination of hardware and software. When a portion or the entirety of the learning model is implemented as software, one or more instructions, which constitute the learning model, may be stored in the memory 2300.

The processor 2600 may infer a result value with respect to new input data by using the learning model, and generate a response or control command based on the inferred result value.

Figure 17:
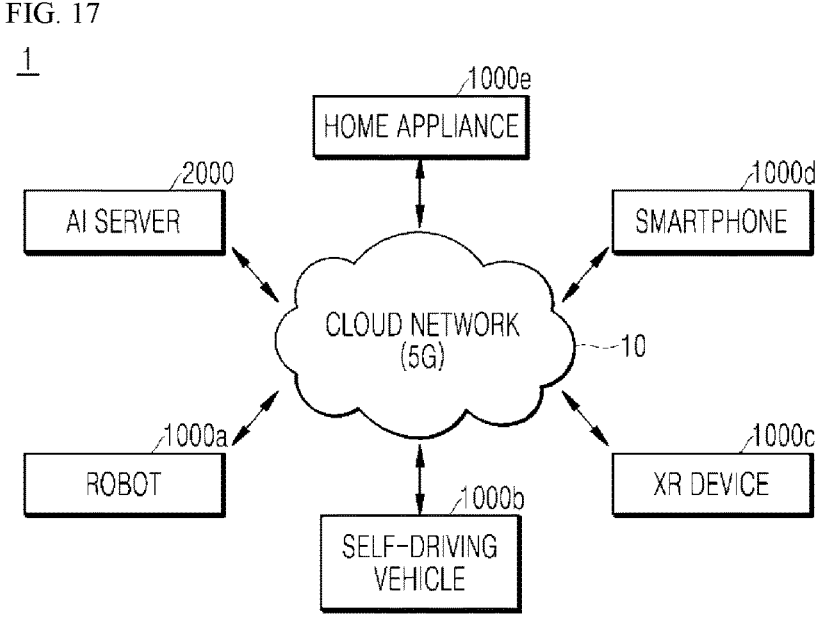
FIG. 17 illustrates an AI system according to one embodiment.

FIG. 17 illustrates an AI system 1 according to an embodiment.

Referring to FIG. 17, in the AI system 1, at least one or more of an AI server 2000, a robot 1000*a*, an autonomous vehicle 1000*b*, an XR device 1000*c*, a smartphone 1000*d*, or a home appliance 1000*e* are connected to a cloud network 10. Here, the robot 1000*a*, the self-driving vehicle 1000*b*, the XR device 1000*c*, the smartphone 1000*d*, or the home appliance 1000*e*, to which AI technology is applied, may be referred to as AI devices 1000*a* to 1000*e*.

The cloud network 10 may include part of the cloud computing infrastructure or refer to a network existing in the cloud computing infrastructure. Here, the cloud network 10 may be constructed by using the 3G network, 4G or Long Term Evolution (LTE) network, or a 5G network.

In other words, individual devices (1000*a* to 1000*e*, 2000) constituting the AI system 1 may be connected to each other through the cloud network 10. In particular, each individual device (1000*a* to 1000*e*, 2000) may communicate with each other through the base station but may communicate directly to each other without relying on the base station.

The AI server 2000 may include a server performing AI processing and a server performing computations on big data.

The AI server 2000 may be connected to at least one or more of the robot 1000*a*, autonomous vehicle 1000*b*, XR device 1000*c*, smartphone 1000*d*, or home appliance 1000*e*, which are AI devices constituting the AI system, through the cloud network 10 and may help at least part of AI processing conducted in the connected AI devices (1000*a* to 1000*e*).

At this time, the AI server 2000 may train the AI network according to the machine learning algorithm instead of the AI devices 1000*a* to 1000*e*, and may directly store the learning model or transmit the learning model to the AI devices 1000*a* to 1000*e*.

At this time, the AI server 2000 may receive input data from the AI device 1000*a* to 1000*e*, infer a result value from the received input data by using the learning model, generate a response or control command based on the inferred result value, and transmit the generated response or control command to the AI device 1000*a* to 1000*e*.

Similarly, the AI device 1000*a* to 1000*e* may infer a result value from the input data by employing the learning model directly and generate a response or control command based on the inferred result value.

As described above in association with embodiments, although some cases were described, other various embodiments are possible. The technical contents of the embodiments described above can be combined in various ways unless they are not compatible, so new embodiments may be correspondingly implemented.

What is claimed is:

1. A robot, comprising:
   a controller;
   a force sensor located in the robot and configured to sense an external force applied to the robot, the force sensor being in communication with the controller;
   an arm having a first end;
   an adsorber configured to adsorb a target object, the adsorber located at the first end of the arm, the adsorber including:
      at least one suction nozzle to suck air to adsorb the target object;
      at least one ejection nozzle to eject air;
      a flow passage switch in communication with the controller, the suction nozzle, and the ejection nozzle; and
      a frame accommodating at least a portion of the suction nozzle, the ejection nozzle, and the flow passage switch,
   wherein the controller is configured to control the flow passage switch to selectively open the at least one suction nozzle and the at least one ejection nozzle, and
   wherein the force sensor is configured to sense a first external force generated when the air ejected from the ejection nozzle impinges against the target object as the adsorber approaches the target object.

2. The robot according to claim 1, wherein the adsorber further includes:
   an adsorption plate encircling an end of the suction nozzle; and
   a protrusion protruding from the frame;
   wherein at least a portion of the suction nozzle and the adsorption plate are located at a center of the protrusion, and wherein at least a portion of the ejection nozzle is located at the protrusion such that the ejection nozzle is disposed at an outside of the suction nozzle and the adsorption plate.

3. The robot according to claim 2, wherein the at least one ejection nozzle is a plurality of ejection nozzles that encircle the adsorption plate.

4. The robot according to claim 3, wherein the at least one suction nozzle is a plurality of suction nozzles that are radially located about the center of the protrusion.

5. The robot according to claim 3, wherein the flow passage switch is configured to simultaneously open the plurality of ejection nozzles to eject the air simultaneously through the plurality of ejection nozzles.

6. The robot according to claim 3, wherein the flow passage switch is configured to sequentially open each of the ejection nozzles of the plurality of ejection nozzles to sequentially eject the air in a clockwise direction or a counterclockwise direction.

7. The robot according to claim 3, wherein the flow passage switch is configured to alternately repeat a pattern of simultaneously ejecting the air to the target object through the plurality of ejection nozzles and sequentially ejecting the air to the target object in a clockwise direction or a counterclockwise direction.

8. The robot according to claim 1, wherein the controller is configured to, when the force sensor senses the first external force, control the ejection nozzle to gradually reduce an air ejection amount of the ejection nozzle.

9. The robot according to claim 8, wherein the force sensor is configured to sense a second external force generated by a contact between the adsorber and the target object.

10. The robot according to claim 9, wherein the controller is configured to, when the force sensor senses the second external force, control the flow passage switch to close the ejection nozzle and open the suction nozzle and to gradually increase an air suction amount of the suction nozzle.

11. The robot according to claim 1, further comprising:
a compressor; and
a first air flow line having a first end connected to the flow passage switch and a second end connected to the compressor.

12. The robot according to claim 1, further comprising a vision sensor in communication with the controller, the vision sensor being configured to sense a distributed pattern of foreign objects or water on a surface of the target object.

13. The robot according to claim 1, further comprising a coupler coupling the arm to the adsorber, the coupler including:
a first part located in the first end of the arm; and
a second part located in the frame, the second part being detachable from the first part.

14. The robot according to claim 13, wherein the first part includes a suction hole, and
wherein the second part includes a ball moveable relative to the first part to close the suction hole.

15. The robot according to claim 14, wherein the coupler further includes a second air flow line in communication with the suction hole, and wherein, when air is sucked through the suction hole through the second air flow line, the ball closes an inlet of the suction hole such that the first part and the second part are coupled to each other.

16. A method of controlling the robot of claim 1, the robot further including a vision sensor in communication with the controller and a force sensor in communication with the controller, the method comprising:
sensing a distributed pattern of foreign objects or water on a surface of the target object by the vision sensor of the robot;
selecting an ejecting pattern of the air ejected to the target object from the ejection nozzle based on information obtained by the vision sensor by the controller;
moving the adsorber toward the target object;
ejecting the air to the target object by the ejection nozzle as the adsorber is moved toward the target object;
sensing a first external force generated when the air ejected from the ejection nozzle impinges on the target object by the force sensor;
gradually reducing an air ejection amount of the ejection nozzle by the controller in response to the first external force sensed by the force sensor;
sensing a second external force generated by a contact of the adsorber and the target object by the force sensor; and
adsorbing the target object to the adsorber by the controller in response to the second external force sensed by the force sensor.

17. The method according to claim 16, wherein the at least one ejection nozzle includes a plurality of ejection nozzles, and
wherein the ejecting pattern includes at least one of simultaneously ejecting the air to the target object by the plurality of ejection nozzles or sequentially ejecting the air to the target object in a clockwise direction or a counterclockwise direction by the plurality of ejection nozzles.

18. The method according to claim 16, wherein the at least one ejection nozzle includes a plurality of ejection nozzles, and
wherein the ejecting pattern includes alternately repeating a pattern of simultaneously ejecting the air to the target object through the plurality of ejection nozzles and sequentially ejecting the air to the target object in a clockwise direction or a counterclockwise direction.

19. The method according to claim 16, wherein adsorbing of the target object by the adsorber includes:
sensing whether the second external force is maintained for a set time or longer by the force sensor;
stopping movement of the adsorber;
controlling the flow passage switch by the controller to close the ejection nozzle;
controlling the flow passage switch by the controller to open the suction nozzle; and
gradually increasing an air suction amount of the suction nozzle by the controller.

* * * * *